May 18, 1926.
P. M. REA
1,585,108
COMBINATION DRIVE DOWN AND PULLING SPEAR
Filed Jan. 5, 1925     2 Sheets-Sheet 1
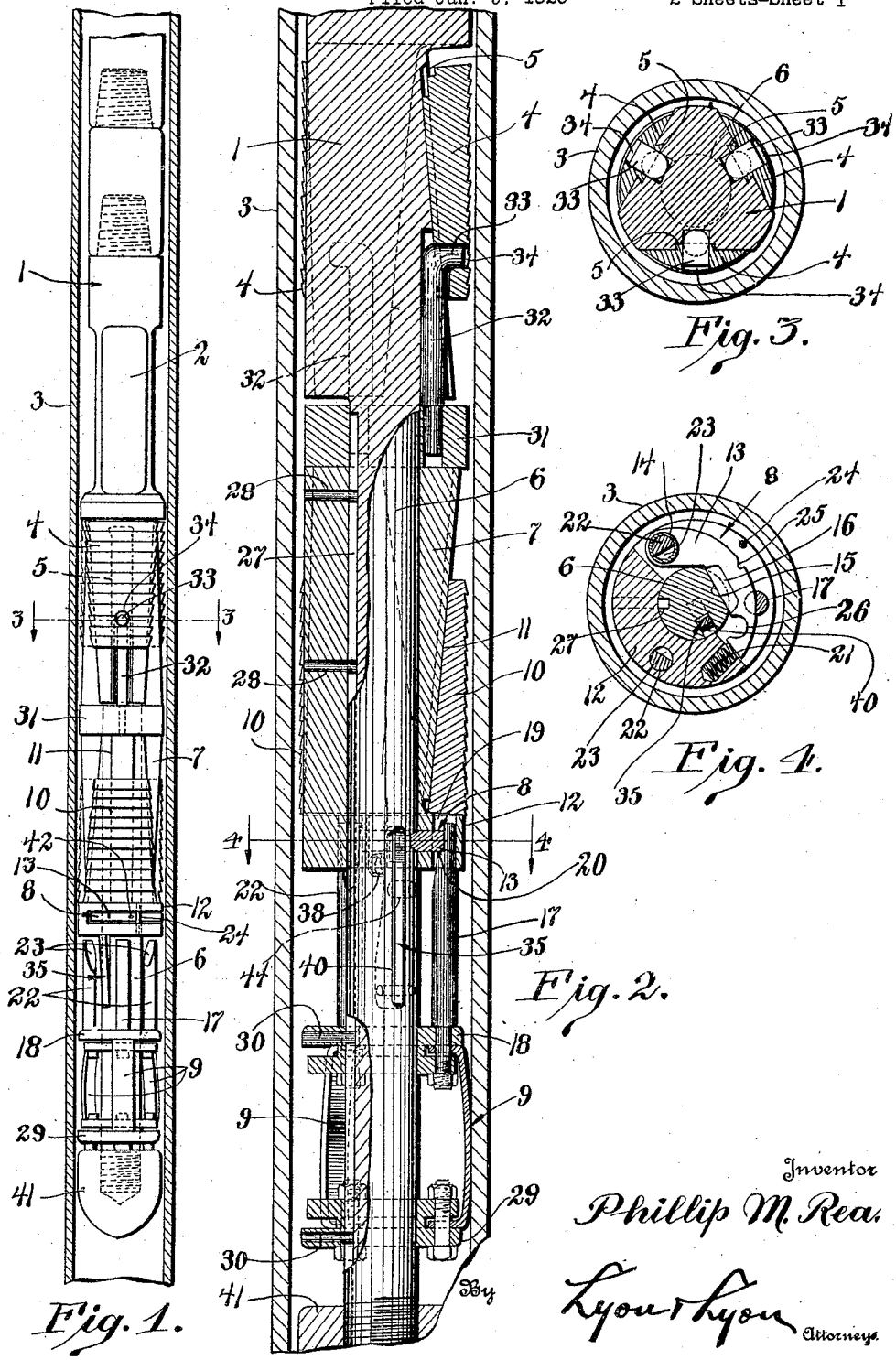
Inventor
Phillip M. Rea,
By Lyon & Lyon
Attorneys.

May 18, 1926. 1,585,108
P. M. REA
COMBINATION DRIVE DOWN AND PULLING SPEAR
Filed Jan. 5, 1925 2 Sheets-Sheet 2

Inventor
Phillip M. Rea.
By Lyon & Lyon
Attorneys

Patented May 18, 1926.

1,585,108

UNITED STATES PATENT OFFICE.

PHILIP M. REA, OF ELGIN, ILLINOIS, ASSIGNOR TO UNION TOOL COMPANY, OF TORRANCE, CALIFORNIA, A CORPORATION OF CALIFORNIA.

COMBINATION DRIVE DOWN AND PULLING SPEAR.

Application filed January 5, 1925. Serial No. 725.

This invention relates to a casing spear, and the general object of the invention is to produce a combination drive down and pulling spear of simple construction and in which the slips can be controlled by up jars and down jars; also to produce a spear of this type in which the use of a spring is avoided for pressing the pull-up slips into their contracted position; a further object of the invention is to improve the general construction of casing spears of this type and particularly to provide an improved means for controlling the same through the agency of a drag spring within the casing.

Further objects of the invention will appear hereinafter.

The invention consists in the novel parts and combination of parts to be described hereinafter, all of which contribute to produce an efficient combination drive down and pulling spear.

A preferred embodiment of the invention is described in the following specification, while the broad scope of the invention is pointed out in the appended claims.

In the drawings:

Fig. 1 is a side elevation of a casing spear embodying my invention and showing the same within a length of casing, which is shown in section; certain parts are broken away.

Fig. 2 is a vertical section through the casing spear shown in Fig. 1, certain parts being broken away or shown in elevation; this view is upon an enlarged scale and shows the parts in the relation which they have when the spear is passing down the casing.

Fig. 3 is a cross section upon an enlarged scale, taken on the line 3—3 of Fig. 1.

Fig. 4 is a section taken on the line 4—4 of Fig. 2.

Figure 5:
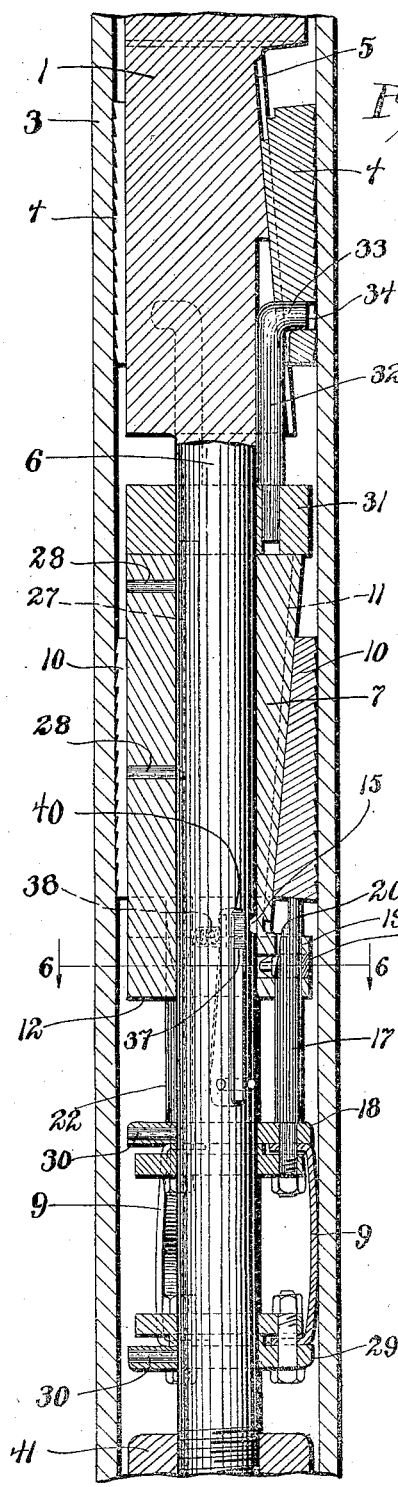
Fig. 5 is a vertical section similar to Fig. 2, but showing the parts in the relation which they have after the spear has been operated in such a way as to set the slips against the casing wall.
Figure 6:
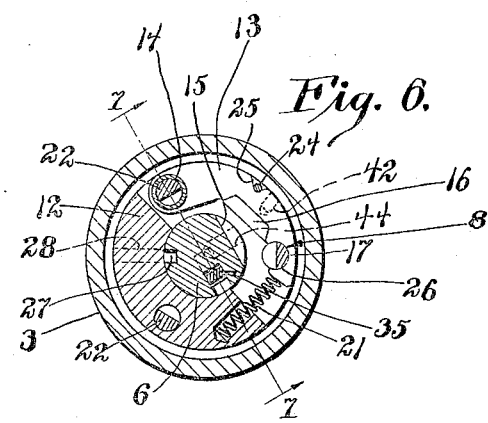
Fig. 6 is a cross section taken on the line 6—6 of Fig. 5.

In practicing my invention, I provide a body 1, the upper portion of which is constructed for attachment to the lower end of the tool string, the upper end of the body being preferably provided with a "square" 2 below which the body is provided with pull-up slips; these slips are mounted on the body in such a way that they have a contracted or collapsed position and also an expanded position, in the latter of which they will engage the wall of the casing 3. In the present instance I provide three of these pull-up slips 4, which are guided to slide on dovetailed slipways 5 which converge in an upward direction. In other words, these slips will contract in a relatively elevated position, and when in a relatively depressed position will be expanded. Below the location of the pull-up slips the body is preferably formed into a reduced stem 6 on which a sleeve 7 is mounted to slide up or down. I provide a latch device 8 for latching this sleeve to the stem 6 of the body (see Fig. 4) and this latch device is preferably controlled by means of a drag spring 9 (see Fig. 2). The outer side of the sleeve is provided with a plurality of down jar slips which have a contracted position and an expanded position. In the present instance I provide three down-jar slips 10, which are guided to slide on slipways 11 respectively, and these slipways converge toward the axis of the body in an opposite direction from the slipways 5 which guide the pull-up slips 4.

The lower end of the sleeve 7 is formed into a collar 12 which acts as a stop to limit the downward movement of the down jar slips 10.

The latching device 8 preferably includes a trigger 13 which is movably mounted on collar 12 so as to swing in a transverse plane with respect to the axis of the body. I prefer to mount this trigger on a tubular pivot pin 14. The stem 6 of the body is provided with means to cooperate with the trigger 13 to hold the latch or sleeve against movement along the body. For this purpose, the stem is provided with a transverse notch or recess 15, which is engaged by a fin 16 formed on the inner side of the trigger.

The trigger 13 is normally held in its latching position in which it is shown in Figure 4 by detent means connected with the drag spring 9, and the construction is such that when the body is pulled upwardly the drag spring 9 will release the latch device 8 and enable the trigger 13 to disengage itself from the stem, thereby permitting the sleeve 7 and the down jar slips 10 to descend by gravity on the body. In the present instance, the detent means is in the form of a push rod 17, the lower end of which is attached to the upper head 18 of the drag spring. The upper end of this push rod is received in an opening 19 in the collar 12 and engages the outer side of the trigger (see Fig. 2). In addition to this, I construct the push rod 17 so that it will engage the trigger 13 in such a way that the trigger will prevent the drag spring 9 from moving upwardly relatively to the sleeve when the spear is being passed down the casing. For this purpose, I provide the push rod 17 with a shoulder 20 which engages the under face of the trigger.

I also provide means in the form of a coil spring 21 to force the trigger 13 outwardly when the push rod 17 releases it (see Fig. 4). With this organization of parts, it will be evident that if the body is pulled upwardly the drag spring will drag in the casing and will pull the push rod 17 away from the trigger. The trigger will then release the sleeve 7 which will descend by gravity, carrying with it the down jar slips 10.

I provide means for engaging the down jar slips 10 to give them a relative upward movement on the sleeve when the sleeve descends, and this relative upward movement will set them against the casing. In order to engage the down-jar slips as suggested, I may utilize the push rod 17 to engage one of the slips which may be in alignment with it. In order to engage the other two down-jar slips, I provide two push rods 22 (see Fig. 1) which are similar in construction to the push rod 17, except that they are devoid of any shoulder, such as the shoulder 20, and their upper ends are simply provided with inclined faces 23 on their inner sides so as to clear the slipways 11 when the sleeve descends; in other words, when the sleeve descends these push rods 22 pass through openings in the collar 12 and thereafter engage the lower ends of their corresponding down-jar slips. One of these push rods 22 is in alignment with the tubular pivot pin 14 and slides through the collar at that point. After the trigger 13 is released, its spring 21 moves it out against a stop pin 24 (see Fig. 4) which engages in a notch 25 on the outer edge of the trigger.

The trigger is constructed so that when in its outermost or unlatched position, it will not obstruct any of the push rods and will permit them to return and move up through the collar. For this purpose, the outer end of the trigger is provided with a cutaway portion or throat 26, which will align with the special push rod 17 when the trigger is "open" or in its release position. In order to insure the alignment of the push rods 17 and 22 with their corresponding openings in the collar, I provide means for preventing rotation of the sleeve and the drag spring 9 on the stem 6. For this purpose the stem is provided with a longitudinal keyway 27 (see Fig. 2) and the sleeve is provided with pins 28 which run in this keyway. In a similar way the heads 18 and 29 of the drag spring are provided with pins 30 which also run in this key slot 27.

The sleeve 7 is mounted in such a way that it can support the pull-up slips 4. In order to accomplish this I prefer to provide a collar 31 which slides on the stem 6 just above the sleeve, and this collar is connected by three stems or hook rods 32 with the lower ends of the slips 4. In other words, the upper end of each stem 32 has a lateral extension 33 which slides freely in an opening 34 in the lower end of the slip. As the slip rises in its slipway, of course the extension or "hook" 33 will enter further into the opening 34.

Figure 7:
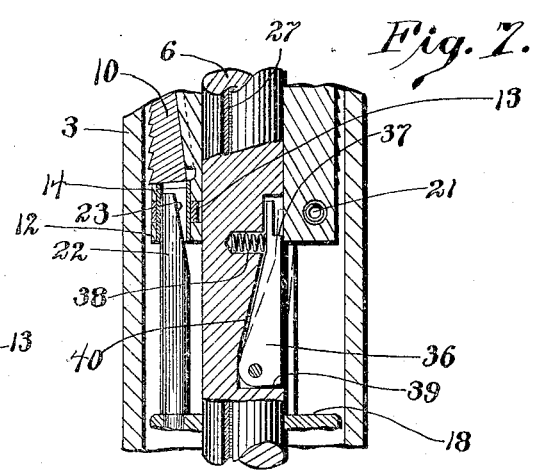
Fig. 7 is a vertical section taken through a trip device and illustrating details of its construction and also details of the means which I may employ for engaging the down jar slips to set them against the casing.

In order to enable the downward movement of the body through the sleeve 7 to engage or "pick up" the sleeve 7 so that the upward movement of the body thereafter can raise the sleeve 7, I provide the body with a trip device 35 (see Figs. 2 and 7) This trip device is in the form of a catch or catch-plate 36 set in a longitudinal slot in the side of the stem. This plate is provided with a shoulder 37 to engage with the lower end of the sleeve, but when the spear is passing down the casing this catch 36 is held in its retracted position by the sleeve (see Fig. 7). A small coil spring 38 back of the catch affords means for forcing it out into its extended position, when the stem 6 descends far enough to enable the shoulder 37 to clear the lower end of the sleeve. After this occurs, of course, the sleeve will be held above the catch. In this connection, it should be understood that when the body is moved downwardly in this way, the slipways 5 will have descended also so that the slips 4 will be relatively elevated in the slipways, and this will hold them out of engagement with the casing wall. In other words, when the trip device 35 is holding the sleeve 7 elevated, it will also hold the slips 4 elevated, because they are supported on the collar 31. Hence, in this position of the sleeve the pull-up slips will be held disengaged and away from the casing to permit the spear to be withdrawn from the casing. The lower end of the catch plate 36 is formed with a shoulder 39 which engages the adjacent wall of the trip slot 40 and limits the outward movement of the catch (see Fig. 7).

At the lower end of the stem I provide a rounded nut 41 which prevents the drag spring from passing off of the stem 6 and the rounded lower face of this nut will guide the spear in passing it down the casing.

In order to assist the operator of the spear and facilitate setting the trigger 13 in the notch 15, I provide the outer side of the trigger with a small socket 42 to receive the end of a wire or pin. By the use of such an instrument, the trigger can be pushed into the notch 15 compressing its spring 21, and when the trigger is in its latching position, the drag spring 9 should then be positioned so that the push rod 17 will engage the back of the trigger and hold it in place.

Figure 8:
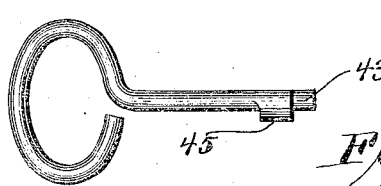
Fig. 8 is a side elevation of a setting tool which I may employ to facilitate setting the parts of the spear preparatory to sending it down the casing.

In order to assist the operator of the device and facilitate the lifting of the sleeve, I provide the setting tool which is illustrated in Figure 8. This tool includes a trip 43 which may be inserted in a socket 44 in the side of the stem 6 (see Fig. 2). After being inserted in this socket, the setting tool can be rotated so that its cam 45 will engage the under face of the collar 12 and will raise the collar. In this way the sleeve can be raised sufficiently to take its weight off the shoulder 37 and the catch 36 can then be forced inwardly and the sleeve then permitted to descend over the catch so that its lower edge is below the shoulder 37.

I shall now describe the mode of operation of this casing spear: When the casing spear is passing down the casing, the lower edge of the sleeve overlaps the trip or catch 36, as the spear descends, the drag spring 9 drags on the wall of the casing and holds the shoulder 20 up against the underface of the trigger 13. The projecting end of the push rod 17 beyond the shoulder 20 holds the trigger in its latching position. The down-jar slips 10 resting on the collar 12 are out of contact with the wall of the casing. When the parts are in this relation, the sleeve 7 is sufficiently elevated to hold the pull-up slips 4 out of contact with the wall of the casing.

When the spear has descended to the level at which it is to grip the casing for up jar or down jar, the body 1 of the tool should be moved upwardly. When this occurs, the drag spring 9 drags on the casing, releases the trigger 13; the sleeve 7 drops and sets slips 10 against the wall of the casing, and hold the sleeve against further downward movement. As the sleeve 7 moves away from the collar 31, it permits the slips 4 to descend by gravity and they set themselves against the casing wall ready to grip it for an up pull or up jar. An up pull will grip the slips 4 tightly against the casing, that is, it will cause them to "bite" so that they can raise the casing.

After an up pull has been given to the casing, the spear can be released by a down jar or by a relative downward movement of the body. When such a downward movement or down jar occurs, the stem 6 of the body will slide through the sleeve 7 and the shoulder 37 of the catch 36 will eventually get below the lower end of the sleeve. The catch will then extend itself under the lower end of the sleeve 7, which enables the stem to "pick up" the sleeve. By pulling up on the body thereafter, the sleeve 7 will slide further up on the slips 10 and they will drop down to their releasing position, where they are supported on the collar 12. The casing spear can then be withdrawn.

It is understood that the embodiment of the invention described herein is only one of the many embodiments this invention may take, and I do not wish to be limited in the practice of the invention, nor in the claims, to the particular embodiment set forth.

What I claim is:—

1. In a combination drive-down and pulling spear, the combination of a body, pull-up slips guided on the body so as to expand by relative downward movement on the body, a sleeve mounted to slide on the body, down-jar slips guided on the sleeve so as to expand by relative downward movement of the sleeve on the slips, a latch device for latching the sleeve against movement along the body, a drag spring having means for holding the latch device in its latching position and cooperating with the latch device to release the same upon an upward pull of the body, means for supporting the pull-up slips on the sleeve, said sleeve and pull-up slips cooperating upon the release of the latch device, to descend and set the pull-up slips and the down-jar slips in engagement with the casing.

2. In a combination drive-down and pulling spear, the combination of a body, pull-up slips guided on the body so as to expand by relative downward movement on the body, a sleeve mounted to slide on the body, down-jar slips guided on the sleeve so as to expand by relative downward movement of the sleeve on the slips, a latch device for latching the sleeve against movement along the body, a drag spring having means for holding the latch device in its latching position and cooperating with the latch device to release the same upon an upward pull of the body, means for supporting the pull-up slips on the sleeve, said sleeve and pull-up slips cooperating upon the release of the latch device to descend and set the pull-up slips and the down-jar slips in engagement with the casing, to enable an up-jar to pull up the casing through the operation of the pull-up slips, and a trip device carried by the body constructed to cooperate with the sleeve upon a down-jar to lock the sleeve in a relatively elevated position, whereby an up-pull on the body will operate to release the down-jar slips and permit the casing spear to be withdrawn.

3. In a combination drive-down and pulling spear, the combination of a body, pull-up slips guided on the body so as to expand by relative downward movement on the body, a sleeve mounted to slide on the body, down-jar slips guided on the sleeve so as to expand by relative downward movement of the sleeve on the slips, a latch device in the form of a trigger mounted on the sleeve to move in a plane transverse to the body, said body having means to cooperate with the trigger to latch the sleeve against movement along the body, a drag spring having means for holding the trigger in its latching position and cooperating with the latch device to release the same upon an upward pull of the body, a spring associated with the trigger for moving it to its disengaging position when the trigger is released by the upward pull of the body, means for supporting the pull-up slips on the sleeve, said sleeve and pull-up slips cooperating upon the release of the trigger to descend and set the pull-up slips and the down-jar slips in engagement with the casing.

4. In a combination drive-down and pulling spear, the combination of a body, pull-up-slips guided on the body so as to expand by relative downward movement on the body, a sleeve mounted to slide on the body, down-jar slips guided on the sleeve so as to expand by relative downward movement of the sleeve on the slips, a latch device in the form of a trigger movably mounted on the sleeve, said body having means to cooperate with the trigger for latching the sleeve against movement along the body, a drag spring movably mounted on the body below the sleeve, detent means carried by the drag spring for holding the trigger in its latching position while the casing spear is passing down the casing and cooperating with the trigger upon an up-pull of the body to release the trigger and permit the sleeve and the pull-up slips to descend by gravity, said drag spring having means for engaging the down-jar slips whereby the descent of the sleeve sets the down-jar slips and the pull-up slips against the casing and enables an up pull thereafter to pull the casing through the operation of the pull-up slips.

5. In a combination drive-down and pulling spear, the combination of a body, pull-up slips guided on the body so as to expand by relative downward movement on the body, a sleeve mounted to slide on the body, down-jar slips guided on the sleeve so as to expand by relative downward movement of the sleeve on the slips, a latch device in the form of a trigger movably mounted on the sleeve said body having means to cooperate with the trigger for latching the sleeve against movement along the body, a drag spring movably mounted on the body below the sleeve, detent means carried by the drag spring for holding the trigger in its latching position while the casing spear is passing down the casing and cooperating with the trigger upon an up-pull of the body to release the trigger and permit the sleeve and the pull-up slips to descend by gravity, said drag spring having means for engaging the down-jar slips whereby the descent of the sleeve sets the down-jar slips and the pull-up slips against the casing and enables an up pull thereafter to pull the casing through the operation of the pull-up slips, the said sleeve and said body cooperating thereafter upon a down-jar, to permit the body to slide downwardly through the sleeve, and trip means carried by the body operating upon the relative downward movement of the body within the sleeve to lock the sleeve on the body in a relatively elevated position with the pull-up slips withdrawn from the wall or casing whereby an up-pull on the body thereafter will release the down-jar slip from the casing and permit the spear to be withdrawn.

6. In a combination drive-down and pulling spear, the combination of a body, pull-up slipways on the body, pull-up slips guided on the said slipways and cooperating with the body upon an up pull to grip the casing and raise the same, a sleeve guided to slide on the body below the pull-up slips and having down-jar slipways converging toward the axis of the body in a downward direction, down-jar slips carried on the last named slipways and cooperating with the sleeve upon a relative downward movement of the sleeve, to grip the casing and impart the down-jar to the casing, means for supporting the pull-up slips on the sleeve, a drag spring movably mounted on the body below the down-jar slips, a latch device carried by the sleeve, said body having means cooperating with the latch device to latch the sleeve against movement along the body, detent means carried by the drag spring for engaging the latch device when the casing spear is passing down the casing and operating to hold the latch device in its latching position, said drag spring operating upon an up pull on the body, to release the latch device from the detent means and permit the sleeve and pull-up slips to descend by gravity, whereby an up-jar on the body will grip the pull-up slips with the casing to raise the same, said detent means operating upon the descent of the sleeve to engage a down-jar slip and cooperate with the descending sleeve to set the same against the casing wall, said body operating upon a down-jar to descend through the sleeve, means carried by the body operating upon the said descending movement of the body through the sleeve to engage the sleeve to "pick-up" the sleeve on the body after the downward movement of the body has released the pull up slips, whereby an upward pull on the body thereafter will produce a relative upward movement of the sleeve with respect to the down-jar slips, thereby releasing the same and permitting the casing spear to be withdrawn.

7. In a combination drive-down and pulling spear, the combination of a body, pull-up slips guided on the body so as to expand by a relative downward movement from the body, a sleeve mounted to slide on the body below the pull-up slips, means associated with the sleeve to enable an upward movement thereof to raise the pull-up slips in their slipways, down-jar slips carried on the sleeve, a latch device carried by the sleeve, said body having means cooperating with the latch device to latch the sleeve against movement along the body, a drag spring mounted to slide on the body below the sleeve, a push rod corresponding to each down-jar slip and carried by the drag spring, one of said push rods constructed to engage the latch device and cooperating with the same to hold it in its latching position, the latch device operating to prevent the push rods having a relative upward movement with respect to the sleeve when the casing spear is passing down the casing, said drag spring operating upon an up pull of the body to withdraw the push rods, said latch device having means for releasing the same upon the withdrawal of the push rods, said sleeve operating thereafter to descend by gravity, said down-jar slips being in alignment with the push rods whereby the descent of the sleeve engages the down-jar slips with the push rods and effects a relative downward movement of the sleeve with respect to the jar-down slips to set the same against the casing, the descent of the said sleeve operating to permit a descent of the pull-up slips to set them against the casing for pulling to set them against the casing carried by the said body operating upon a down-jar to descend with the body and engage the sleeve so as to "pick up" the sleeve on the body, and thereby lock the pull-up slips in their contacted position, said body and sleeve cooperating thereafter on an up pull of the body to release the down-jar slips and enable the casing spear to be withdrawn.

8. In a combination drive-down and pulling spear, the combination of a body, pull-up slips guided on the body so as to expand by relative downward movement on the body, a sleeve mounted to slide on the body, down-jar slips guided on the sleeve so as to expand by relative downward movement of the sleeve on the slips, a latch device having a trigger mounted on the sleeve to swing toward or away from the body, said body having means cooperating with the trigger to latch the sleeve against movement along the body, a spring associated with the trigger to move it to its releasing position, a drag spring mounted on the body below the sleeve, a push-rod engaging the trigger and operating to hold the same in its latching position when the casing spear is passing down the casing, said push-rod having a shoulder engaging the trigger and operating to prevent relative upward movement of the drag spring with respect to the body when the casing spear is passing down the casing, said drag spring operating upon an up pull of the body to disengage the trigger from the push-rod and thereby permit the trigger spring to release the trigger and sleeve from the body, said sleeve operating thereafter to descend by gravity, one of said down-jar slips operating to engage the said push-rod to effect a relative downward movement of the sleeve to set that slip against the casing, other push-rods carried by the drag spring for engaging the other down-jar slips to set them against the casing, the said descending movement of the sleeve operating to permit a downward movement of the pull-up slips to set them against the casing to enable an up pull on the body to grip the casing with the pull-up slips and raise the same, said body and said sleeve cooperating upon a down-jar thereafter to permit a downward movement of the body through the sleeve, thereby effecting a relative upward movement of the pull-up slips to release the same from the casing, a trip device carried by the body and operating to engage the sleeve upon a down-jar of the body to "pick up" the sleeve on the body, whereupon an up pull on the body will effect an upward movement of the sleeve and disengage the down-jar slips to permit withdrawal of the casing spear.

9. In a combination drive-down and pulling spear, the combination of a body, pull-up slips guided on the body, a sleeve mounted to slide on the body, down-jar slips guided on the sleeve, a latch device for latching the sleeve to the body to prevent longitudinal movement of the sleeve on the body, a drag spring having means for holding the latch device in its latching position and operating to release the latch device upon an upward pull of the body, means for supporting the pull-up slips on the sleeve, and a trip device on the body to enable the body to "pick up" the sleeve by a downward movement of the body through the sleeve.

10. In a combination drive-down and pulling spear, the combination of a body, pull-up slips guided on the body, a sleeve mounted to slide on the body, down-jar slips guided on the sleeve, a latch device for latching the sleeve to the body to prevent longitudinal movement of the sleeve on the body, a drag spring having means for holding the latch device in its latching position and operating to release the latch device upon an upward pull of the body, means for supporting the pull-up slips on the sleeve, a trip device on the body to enable the body to "pick up" the sleeve by a downward movement of the body through the sleeve, and means connected with the drag spring for engaging the down-jar slips.

11. In a combination drive-down and pulling spear, the combination of a body, pull-up slips guided on the body and operating to contract by a relative upward movement, a sleeve mounted to slide on the body, down-jar slips guided on the sleeve, a collar mounted to slide on the body between the sleeve and the pull-up slips and connected with the pull-up slips to enable the sleeve to engage the collar and raise the pull-up slips, a latch device for latching the sleeve to the body to prevent its movement along the body, a drag spring having means for holding the latch device in its latching position and operating to release the latch device upon an upward pull of the body, a trip device on the body to enable the body to "pick up" the sleeves by a downward movement of the body through the sleeve and thereby lock the pull-up slips in their contracted position.

12. In a combination drive-down and pulling spear, the combination of a body, pull-up slips guided on the body so that they move upwardly to their contracted position, a sleeve mounted to slide on the body, a collar mounted on the body between the pull-up slips and the sleeve, stems connecting the pull-up slips with the collar, down-jar slips guided on the sleeve, a latch device for latching the sleeve against movement along the body, a drag spring having means for holding the latch device in its latching position and operating to release the latch device upon an upward pull of the body, said sleeve operating to engage the collar and support the pull-up slips, a trip device on the body to enable the body to "pick up" the sleeve by a downward movement of the body through the sleeve and thereby lock the pull-up slips in a relatively elevated and contracted position on the body, and means carried by the drag spring for engaging the down-jar slips.

13. In a combination drive-down and pulling spear, the combination of a body, pull-up slips guided on the body so as to contract in their elevated position, a sleeve mounted to slide on the body, down-jar slips guided on the sleeve, a latch device for latching the sleeve to the body, a drag spring having means for holding the latch device in its latching position and operating to release the latch device upon an upward pull of the body, means for supporting the pull-up slips on the sleeve, and a trip device on the body normally held in a retracted position by the sleeve and including means for moving the same to an extended position when it passes to a point below the sleeve, said trip device operating when below the sleeve to "pick up" the sleeve on the body and lock the pull-up slips in their relatively elevated and contracted position.

14. In a combination drive-down and pulling spear, the combination of a body, pull-up slips guided on the body, a sleeve mounted to slide on the body, and down-jar slips guided on the sleeve, a latch device including a trigger having a tubular pivot on the sleeve and operating to swing in or out in a plane transverse to the axis of the body, said body having means cooperating with the trigger to latch the sleeve on the body, a drag spring mounted below the sleeve, a push-rod carried by the drag spring operating to engage the trigger when the spear is passing down the casing, a second push-rod in alignment with the tubular pivot of the trigger and adapted to pass therethrough, said drag spring operating upon an up pull of the body to release the trigger and permit the sleeve to descend on the body, said push-rods operating to engage the down-jar slips when the sleeve descends to set the down-jar slips against the casing.

15. In a combination drive-down and pulling spear, the combination of a body, pull-up slips guided on the body, a sleeve mounted to slide on the body, and down-jar slips guided on the sleeve, a latch device including a trigger having a tubular pivot on the sleeve and operating to swing in or out in a plane transverse to the axis of the body, said body having means cooperating with the trigger to latch the sleeve to the body, a drag spring mounted below the sleeve, a push-rod carried by the drag spring operating to engage the trigger when the spear is passing down the casing, a second push-rod in alignment with the tubular pivot of the trigger and adapted to pass therethrough, said drag spring operating upon an up-pull of the body to release the trigger and permit the sleeve to descend on the body, said push-rods operating to engage the down-jar slips when the sleeve descends to set the down-jar slips against the casing, and means for preventing a rotation of the sleeve on the body.

16. In a combination drive-down and pulling spear, the combination of a body, pull-up slips guided on the body, a sleeve mounted to slide on the body, and down-jar slips guided on the sleeve, a latch device including a trigger having a tubular pivot on the sleeve and operating to swing in or out in a plane transverse to the axis of the body, said body having means cooperating with the trigger to latch the sleeve to the body, a drag spring mounted below the sleeve, a push-rod carried by the drag spring operating to engage the trigger when the spear is passing down the casing, a second push-rod in alignment with the tubular pivot of the trigger and adapted to pass therethrough, said drag spring operating upon an up-pull of the body to release the trigger and permit the sleeve to descend on the body, said push-rods operating to engage the down-jar slips when the sleeve descends to set the down-jar slips against the casing, means for preventing a rotation of the sleeve on the body, and means for preventing rotation of the drag spring on the body to maintain alignment of the push rods with their corresponding down-jar slips.

17. In a combination drive-down and pulling spear, the combination of a body, pull-ups slips guided on the body so as to contract in their elevated position, hook-rods connected with the lower ends of the slips, a collar connected with the hook rods and mounted to slide on the body, a sleeve mounted to slide on the body below the collar, means for preventing rotation of the sleeve on the body, down-jar slips guided on the sleeve, a latch device on the sleeve including a trigger mounted to swing in a plane transverse to the axis of the body, said body having a notch to cooperate with the trigger to latch the sleeve to the body, a drag spring below the sleeve having a plurality of push-rods corresponding to the down-jar slips and capable of engaging the lower ends of the down-jar slips, one of said push-rods operating to engage the trigger and hold the same in its latching position when the spear is passing down the casing and also having a shoulder for engaging the trigger to prevent relative upward movement of the push-rods with respect to the sleeve, a trigger spring associated with the trigger for disengaging the trigger and sleeve from the body when the body is pulled upwardly, thereby releasing the sleeve and permitting the same to descend, said push-rods operating upon the descent of the sleeve, to engage the down-jar slips and move the same relatively upwardly on the sleeve, and set the same against the casing, means for preventing rotation of the drag spring on the body to maintain the push-rods in alignment with the down-jar slips, a spring actuated trip device carried by the body and held in its retracted position when the casing spear is passing down the casing, said trip device operating upon the downward movement of the body within the sleeve, to extend itself below the sleeve and thereby enable the body to "pick up" the sleeve and operating to lock the pull-up slips in their contracted position.

Signed at West Chicago, Ill., this 11th day of Dec., 1924.

PHILIP M. REA.